United States Patent [19]

Durhman

[11] Patent Number: 4,611,642

[45] Date of Patent: Sep. 16, 1986

[54] BAG LOADING DEVICE FOR FLOWABLE SUBSTANCES

[75] Inventor: Neil E. Durhman, Prescott, Wis.

[73] Assignee: General Feeds, Inc., St. Paul, Minn.

[21] Appl. No.: 640,032

[22] Filed: Aug. 10, 1984

[51] Int. Cl.$^4$ .............................................. B65B 1/06
[52] U.S. Cl. ......................................... 141/114; 298/7
[58] Field of Search ................ 141/10, 114, 231, 314, 141/317; 241/101.7; 298/15 G, 7

[56] References Cited

U.S. PATENT DOCUMENTS

| | | | |
|---|---|---|---|
| 2,656,658 | 10/1953 | Grady | 53/576 |
| 3,552,346 | 1/1971 | Garden | 298/7 X |
| 3,687,061 | 8/1972 | Eggenmuller et al. | 141/114 X |
| 3,907,214 | 9/1975 | Dankel | 241/101.7 X |
| 3,951,284 | 4/1976 | Fell et al. | 414/786 |
| 4,044,525 | 8/1977 | Forsgren | 241/101.7 X |
| 4,097,090 | 6/1978 | Payne et al. | 298/15 G |
| 4,310,036 | 1/1982 | Rasmussen et al. | 141/114 |
| 4,412,567 | 11/1983 | Kosters | 141/114 |
| 4,446,677 | 5/1984 | Kokido | 53/577 |

FOREIGN PATENT DOCUMENTS 2151116 8/1978 Fed. Rep. of Germany ...... 141/114

*Primary Examiner*—Stephen Marcus
*Assistant Examiner*—Mark Thronson
*Attorney, Agent, or Firm*—Merchant, Gould, Smith, Edell, Welter & Schmidt

[57] ABSTRACT

The present invention is directed to a bagging device for directing a flowable substance from a transport trailer to a flexible agricultural bag. The device includes a tunnel housing attached to the back of the trailer. The open end of the bag is held behind a ridge member and between the ridge member and a stretchable strap so as to resist release of bag until the bag on the ground has been filled. A tray beneath the housing supports the bottom portion of the bag to prevent it from stretching and ripping. A shield near the tires of the trailer prevent the bag from entangling in the tires. The device is especially appropriate for use with flowable commodities such as brewers grains and stillage by-product which rapidly deteriorate unless promptly stored in an air exchange-free enclosure.

6 Claims, 6 Drawing Figures

BAG LOADING DEVICE FOR FLOWABLE SUBSTANCES

FIELD OF THE INVENTION

The present invention is directed to a bag loading device and, more particularly, to a device for directing flowable substances from a transport vehicle, such as a dump truck, to a flexible agricultural bag.

BACKGROUND OF THE INVENTION

Bag filling machines for agricultural products are known in the prior art. For years, agricultural products were stored in bins, elevators, silos, etc. As production on the farms increased, surpluses occurred and storage became more and more of a problem. The problem was so acute that farmers and elevator managers began simply to pile agricultural products on the ground. Spoilage occurred, but there was no other choice. Soon it was discovered that the grains could be contained and spoilage prevented at least along the bottom if piles were made on polyethylene sheets. It was also discovered that polyethylene sheet lined trenches were quite effective for storing silage. Slowly, there was a realization that silage and a few other agricultural products could be packed and stored in above ground bags. In this regard, there are now several bagging machines commercially available. A couple recent patents exemplify available bagging machines.

U.S. Pat. No. 4,310,036 shows a machine having an intake chamber from which silage is moved via a feeder shaft to a primary shaft before entering an output chamber tunnel. An agricultural bag is installed about the walls of the tunnel. Periodically, a tunnel clean out plate is forced by a pair of hydraulic cylinder assemblies toward the bag in order to compress silage into the bag. As the bag fills, the bagging machine moves in a direction away from the bag.

U.S. Pat. No. 4,412,567 is designed differently, but also functions to press silage, haylage and other compressible products into an agricultural storage bag. This machine utilizes an auger to move material from a hopper into a chute around which a bag is attached.

The present invention was derived from the bag packing machines as just described, but is directed to an entirely different agricultural product and storage problem. Various grains are a primary ingredient for raw material for liquid products, such as beer, alcohol, etc. The solid by-product in the form of a grain mash or stillage is high in protein and, consequently, is an excellent feed stock for cattle or other animals. The problem is that such by-products spoil within a few days. Consequently, present practice requires immediate transport of such byproduct from a brewery or alcohol refinery to a feed lot for consumption within two or three days. Because of this spoilage problem, the market for brewers grains and stillage by-products is limited necessarily to large animal producers located within a few miles of the breweries or stills.

To distinguish the storage problem of brewers grains and stillage by-product from that of storing originally harvested grains or silage, it is useful to describe briefly the brewing process. For example, malting barley is boiled, usually in a solution of water and corn syrup while being circulated. After a period of time, the liquid, called wort, is pumped off so that hops and other ingredients may be added while aging to make beer. The mash by-product is a soupy mixture of the wet barley remains. The mixture is drained from the mixing tanks into transport containers, such as large semitrailers or dump trucks. It is this material which forms the commodity commonly called brewers grains. Stillage by-product from stills has a similar consistency, although formed from a different grain. In any case, these mixtures are sterile when drained from the mixing tanks, but unless they are stored in an air exchange-free environment within a few hours, they will spoil within a few days. It is then the problem of transferring these brewers grains and similar products from a transport container to an impervious, flexible agricultural bag for storage to which the present invention is directed.

SUMMARY OF THE INVENTION

The present invention is directed to an apparatus for directing a flowable substance from a trailer or other container to an elongated, flexible agricultural bag. The has a backwall and a mechanism for opening at least a portion of the backwall to allow the substance to flow by gravity from the trailer box to the bag. The bag has a first portion resting on the ground and a second retained on the apparatus. The apparatus includes a housing having connected bottom, top and side walls such that the housing has open first and second ends. The apparatus includes a mechanism for attaching the housing to the trailer box such that the substance flows from the opening mechanism of the backwall of the box into the first end of the housing. The apparatus further includes a mechanism for retaining the second portion of the bag about the second end of the housing. The retaining mechanism includes mechanism for releasing some of the second portion of the bag to the first portion of the bag as the first portion fills with substance flowing from the second end of the housing and as the trailer moves away from the first portion of the bag.

The invention is further directed to a method for filling a flexible bag with a flowable substance contained in a movable trailer. The method is characterized by a number of steps including placing a closed end first portion of the bag on the ground. Then, the method calls for fitting an open end of the bag and a plurality of folded lengths of a second portion of the bag about a tunnel housing wherein the housing is attached adjacent to an openable gate on the trailer. Then, according to the present method a retaining mechanism is placed about the housing between the first and second portions of the bag such that the retaining mechanism holds the second portion of the bag releasably on the housing. The substance from the trailer is emptied through the gate and the tunnel housing into the bag, and the trailer is moved in a direction away from the first portion of the bag as the bag fills. As a further step, the method may include placing a shield between the tires of the trailer and the first portion of the bag before emptying the flowable substance from the trailer into the bag.

One embodiment of the present invention includes a tunnel housing having connected top, bottom and side walls. The housing is attached at a downwardly inclined angle to the back of the trailer. A ridge member is atached to and encircles the housing. The ridge member is for holding or blocking the folded lengths of the second portion of the bag onto the housing and preventing it from slipping off until additional length of bag is needed on the ground for filling purposes. An elastic strap is stretched about the housing adjacent to the ridge member between the ridge member and the first portion of the bag on the ground to offer a resistance to further lengths of bag being pulled off the housing by filling substance.

The present bag loading device is particularly advantageous since it attaches directly to the transport container and since it directs the flowable substance under the force of gravity from the container directly into the bag as opposed to requiring separate mechanical forcing mechanisms as in the art.

The present invention is advantageous since it includes a bag retaining mechanism which offers resistance to release so only sufficient bag needed to receive the flowable substance is in fact pulled from the retaining mechanism. At the same time the mechanism is not complex.

The present invention is further advantageous with the addition of a tray or other mechanism attached beneath the housing to support the bottom portion of the folded length of the second portion of the bag. Oftentimes, water from the flowable substance will gather on the bottom portion of the bag, and if the bottom portion of the bag is not supported before it is pulled to the ground for filling, the bottom portion can rip.

The present invention is also advantageous due to the addition of a shield between the tires of the transport trailer and the first portion of the bag lying on the ground. Without the shield, it is possible that flowable substance can fill the bag quite rapidly and pull the bag into the tires where it may be caught and ripped. In addition, the present invention teaches the further advantage of using the tire shield in an up or storage position as a tire mud flap.

Yet another advantage of the present invention results with the addition of a deflector plate above the bottom of the device housing and also above the tail lights of the transport trailer. In this way, a bag may be loaded with flowable substance without the substance obscuring or caking on the tail lights.

These several advantages and other objects obtained by this invention are further explained and may be better understood by reference to the drawings and descriptive matter wherein a preferred embodiment is illustrated and described in detail hereinafter.

DETAILED DESCRIPTION OF THE PREFERRED EMBODIMENT

Figure 1:
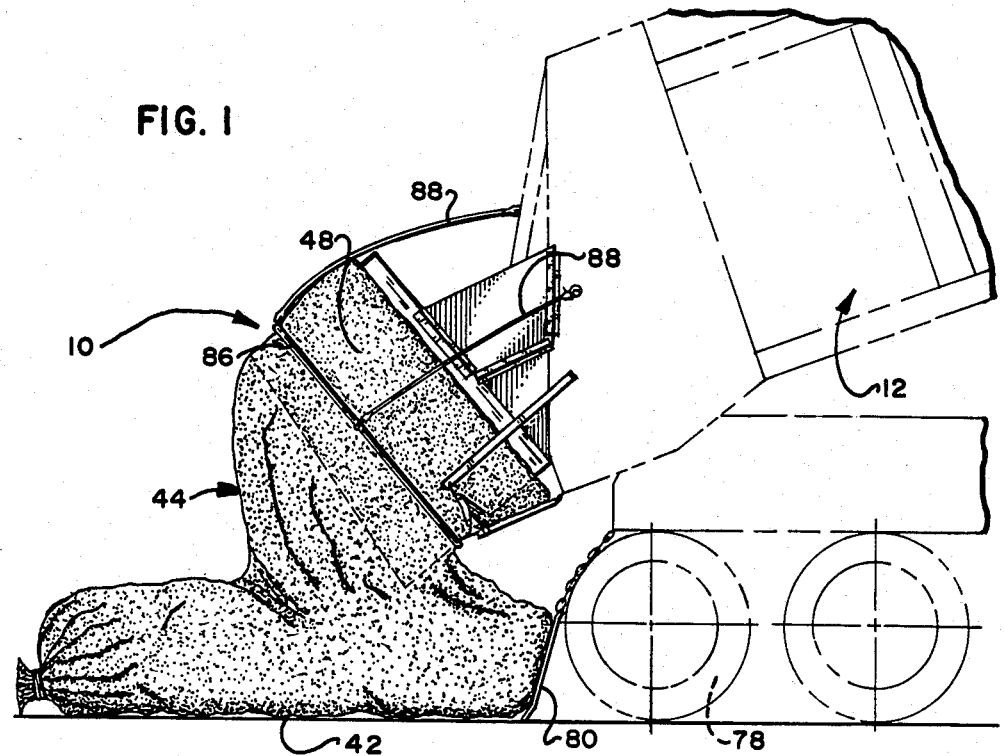
FIG. 1 shows a side elevational view of a bagging device in accordance with the present invention as used on a dump truck.
Figure 2:
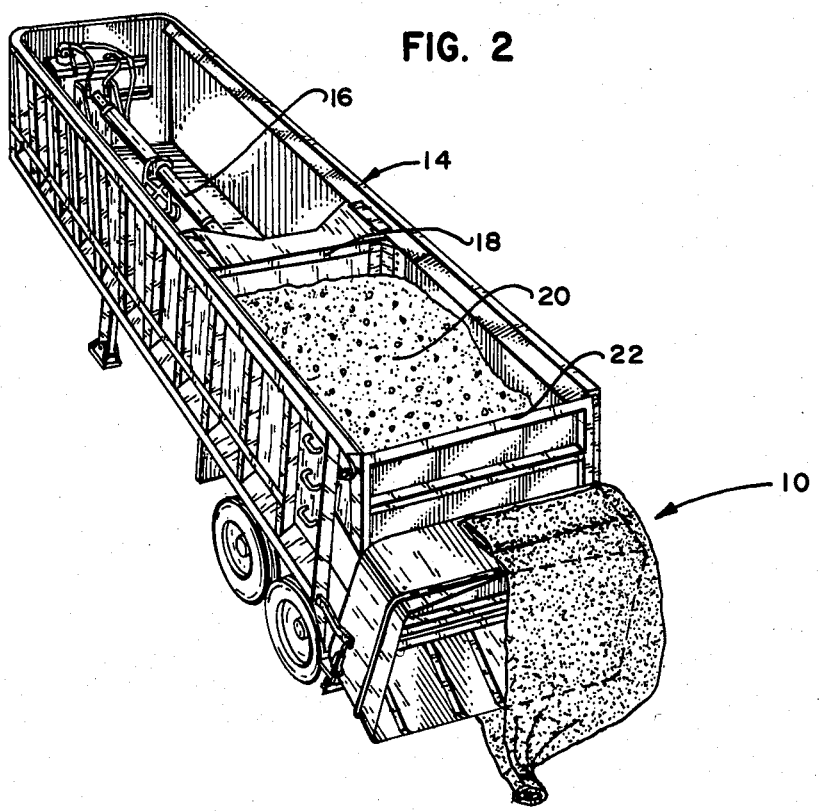
FIG. 2 shows a perspective view of a device in accordance with the present invention used on a trailer having a moving wall, off-loading device.

Referring now to the drawings wherein like reference numerals designate identical or corresponding parts throughout the several views, and more particularly to FIGS. 1 and 2, apparatus in accordance with the present invention is designated generally the numeral 10. In FIG. 1, apparatus 10 is shown in conjunction with a trailer 12 having a box or container which may be raised at the front end for easy dumping of a flowable substance therein. In FIG. 2, apparatus 10 is shown attached to a trailer 14 having a powerable extension mechanism 16 for pushing a wall 18 to force substance 20 from the back 22 of trailer 14. These are but two examples of the types of transport units with which the present invention may be used.

Apparatus 10 is shown in greater detail in FIGS. 3–6. Apparatus 10 includes a tunnel housing 24 having a top side 26, a bottom side 28, and connecting sides 30 and 32 therebetween. In the preferred embodiment shown, housing 24 has arcuate corners so as to form a laterally elongated tunnel. As shown most clearly in FIG. 6, housing 24 has a center line 34 downwardly inclined with respect to a center line 36 of trailer box 38. In like fashion, bottom 28 is inclined downwardly with respect to bottom 40 of box 38 so that flowable substance is directed toward the first portion 42 of bag 44, the first portion 42 resting on the ground (see FIG. 1).

A plurality of curved rods 45 are welded or otherwise attached at the arcuate corners between each of sides 30 and 32 and top 26. Members 44 may be rods, plates, or other structural item since they are intended simply to provide strength between sides 30 and 32 and top 26.

Figure 6:
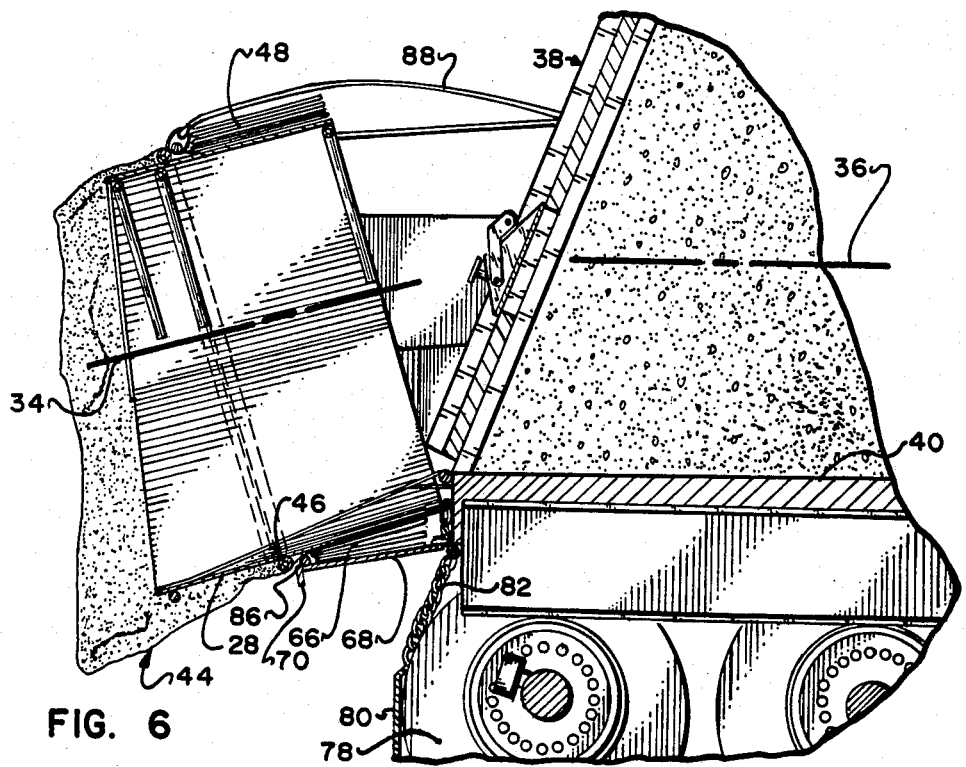
FIG. 6 is a cross-sectional view, taken along line 6—6 of FIG. 5.

Ridge member 46 encircles housing 24 and provides further structural strength to housing 24. In addition, however, ridge member 46 functions as a retainer or blocking member for the second portion 48 of bag 44 which is installed about housing 24 in the form of a plurality of folds as shown in FIG. 6. Although ridge member 46 completely encircles housing 24 in the preferred embodiment, it is understood that the retaining function could be accomplished in an equivalent fashion, for example, with simply a member along top 26.

Housing 24 may be fixedly or releasably attached to trailer 38. Although a fixed attachment is preferred as discussed hereinafter, it is envisioned that housing 28 could be held by a portable frame which could be wheeled to the back of a trailer for releasable attachment and only occasional use. As indicated, however, since trailers 38 are commonly dedicated to continual use for transport of brewers grains or stillage by-product, it is preferable to bolt or attach by weld apparatus 10 to trailer 38. As shown, bottom 28 is welded along intersection 49 with trailer 38. Also, side walls 50 extending between the back 52 of trailer 38 and side walls 30 and 32 of housing 24 are welded to each of them. In addition, a plurality of brace members 54 extend between bottom 28 and back 52 of trailer 38 at a location above tail lights 56 on back 52. Brace members 54 are welded or otherwise attached at both ends. A deflector plate 58 is attached to brace members 54 at a location above bottom 28 of housing 24 and also above tail lights 56. Deflector plate 58 protects tail lights 56 and directs the flowable substance from trailer 38 during unloading from running on tail lights 56. Rather, the flowable substance is deflected over the tail lights so that the substance does not obscure the tail lights when they are operable as tail lights after emptying the substance from the trailer. At the same time, brace members 54 are widely spaced so that they do not obscure tail lights 56 from trailing vehicles during travel.

Side walls 50 not only provide an attachment mechanism for housing 24 to trailer 38, but they also provide walls for the flowable substance as it empties from either a gate mechanism 60 or through an open space as a result of entire back 52 pivoting to a partial open position. Although side walls 50 can be made of any height, it may be preferable to provide for a removable upper portion 62. Guide members 64 at the side edges and bottom edge of an upper portion 62 form channel spaces for receiving and holding in place upper portion 62. One each of guide members 64 are attached on one side of box 38 to side wall 32 of housing 24, side wall 50, and a side of trailer box 38 and on the other side in a similar fashion.

Figure 3:
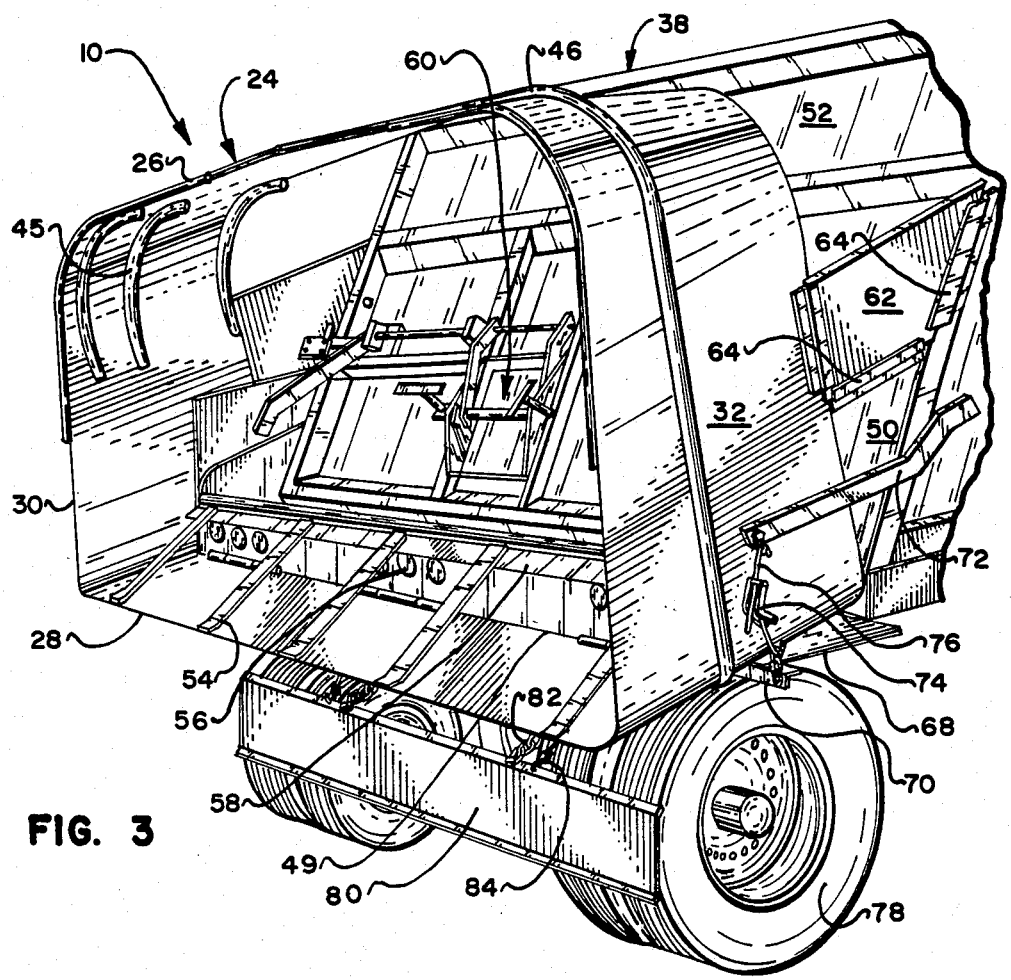
FIG. 3 shows a perspective view of the present invention without a bag attached.
Figure 4:
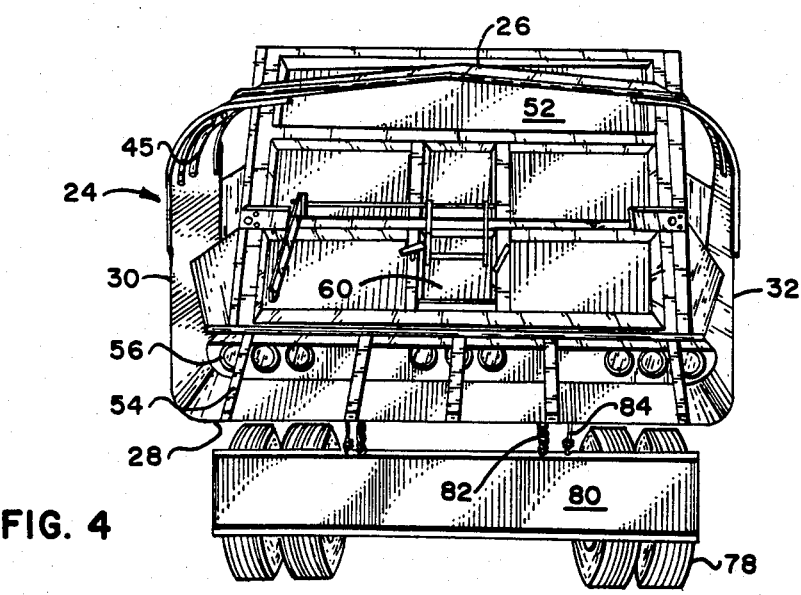
FIG. 4 is an end elevational view of the device of FIG. 3.
Figure 5:
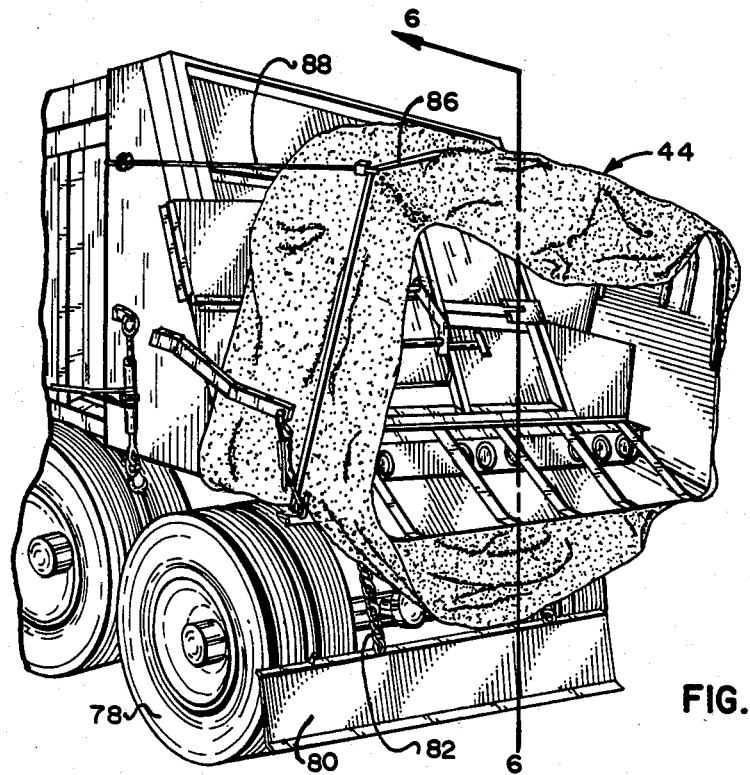
FIG. 5 is a perspective view of a device in accordance with the present invention, with a bag attached and a shield mechanism adjacent to the tires of the transport trailer.

As shown in FIGS. 5 and 6, a bottom of bag 44 including a plurality of folded lengths 66 are supported by a tray 68. As shown in FIG. 3, tray 68 is a flat sheet attached at one end with a plurality of brackets (not shown) to the bottom, back of trailer 38 or housing 24. The other end of tray 68 has an angle 70 (see FIG. 3) or other structural member running parallel to the back of trailer 38. Angle 70 is hung at its ends from a cantilevered support member 72 attached to a side of trailer 38 and extending rearwardly to near ridge member 46, but spaced from side wall 32 so that the folded lengths 66 of bag 44 can fit between support member 72 and side wall 32 (or 30). A tensioning device 74 is installed on the cable 76 or other connecting line between support member 72 and angle 70.

Since brewers grains and stillage by-product is ordinarily very runny, the substance fills a bag to a height of only one to two feet and then runs in the direction of least resistance. Often, the substance runs toward the trailer (as shown in FIG. 1) and pulls sufficient bag from housing 24 so that the bag fills in a region underneath housing 24 for a short period of time before the operator has moved trailer 38 in a direction away from the first portion 42 of bag 44 on the ground. So as to protect bag 44 from becoming entangled in tires 78 of trailer 38, a shield 80 is positioned just rearwardly of tires 78. Shield 80 is a flat, vertical plate extending from the outside of tires 78 on both sides of trailer 38. Preferably, shield 80 has rounded edges so that it does not tear bag 44 inadvertently. Shield 80 is supported by a pair of chains 82, as shown in FIG. 5, so that as trailer 38 moves, shield 80 is dragged along and still maintains a proper position just behind tires 78. In a transport position, shield 80 is also supported by a pair of cords 84 or similar line attached between the top of shield 80 and bottom 28 of housing 24. With both chains 82 and cords 84 holding shield 80, it is raised from the ground and spaced rearwardly from tires 78 so as to form a mud flap for tires 78.

As shown in FIG. 6, the second portion 66 of bag 44 comprises a plurality of folded lengths installed rearwardly of ridge member 46 so that ridge member 46 blocks second portion 48 from sliding off housing 24. Preferably, second portion 48 is folded as an accordian with the next fold to be pulled being adjacent to housing 24. To further resist the release of more of second portion 48 to first portion 42, an elastic strap 86 is stretched to encircle housing 24 on the outer side of bag 44 in a location adjacent to ridge member 46, between ridge member 46 and the second portion of bag 44. Strap 86 is held by a plurality of secondary stretchable cords 88 hooked between strap 86 and trailer 38 at various locations around strap 86.

In use, apparatus 10 is either permanently affixed to trailer 38 as discussed hereinbefore or temporarily attached as indicated as a possibility. In either case, trailer 38 is driven with flowable substance contained therein to the location where a filled bag is to be located for long term storage of brewers grains, stillage by-products or other flowable substance. If a shield 80 is used, it is unhooked at cords 84 so as to move from it from a mud flap position to a shield position adjacent to tires 78. A first portion of bag 44 is closed and placed on the ground. The other open end of bag 44 is fitted about housing 24. As discussed, the plurality of folded lengths are placed on the other side of ridge member 46 as the ground portion or first portion 42. Stretchable strap 86 is emplaced about bag 44 adjacent to ridge member 46 between ridge member 46 and the second portion 48 of bag 44. If necessary, removable side walls 62 are installed. The bottom folds of second portion 48 of bag 44 is carefully fitted between bottom 28 and tray 68 so as to be supported on tray 68. The gate mechanism 60 or back 52 is opened so as to release flowable substance within trailer 38. As the substance runs due to the force of gravity and fills first portion 42 of bag 44 on the ground, trailer 38 is moved away from first portion 42 so that more of bag 44 is pulled from between stretchable strap 86 and ridge member 46. When sufficient substance has been dumped, gate mechanism 60 or back 52 is closed. The remainder of second portion 48 of bag 44 is pulled from housing 24 and closed. Shield 80 is raised so that cords 84 may again be fastened to bottom 28 of housing 24. Since deflector 58 has protected tail lights 56 from becoming obscured, trailer 38 may then be immediately transported to another location.

Thus, the details of structure and function, as well as the advantages of the present invention, have been described in detail. It is understood, however, that the embodiment described, although preferred, is representative of the invention. Consequently, changes made, especially in matters of shape, size, arrangement and combinations of components and assemblies, to the full extent extended by the general meaning of the terms in which the appended claims are expressed, are within the principle of the present invention.

What is claimed is:

1. Apparatus for directing a flowable substance from a transport location to a storage location, comprising:
   a trailer having a box for transporting said substance, said trailer box having a back wall and means for opening at least a portion of the back wall, said trailer box being supported by tires;
   an elongated, flexible bag for storing said substance, said bag having a first portion resting on the ground and a second portion;
   a housing having first and second ends, said housing including means for receiving through said first end said substance from said box and directing said substance flowing under the force of gravity downward through said second end to said first portion of said bag resting on the ground;
   means for attaching said housing at said first end to said trailer box; and
   means for retaining said second portion of said bag about the second end of said housing, said retaining means including means for releasing some of said second portion of said bag to said first portion of said bag as said first portion fills with said substance and pulls said second portion of said bag from said housing;
   whereby the first end of said housing is attached to said trailer box to receive from said box said substance flowing under the force of gravity to allow said housing to direct said substance downward through the second end of said housing to said bag, said bag being pulled as a result of said substance filling the first portion of said bag so that said releasing means may release some of the second portion of said bag retained on said housing by said retaining means.

2. Apparatus in accordance with claim 1 including means, located beneath said housing, for supporting from beneath a bottom portion of the second portion of said bag and means for attaching said supporting means to at least one of said housing and said trailer box.

3. Apparatus in accordance with claim 2 wherein said supporting means includes a tray for holding the bottom portion of the second portion of said bag.

4. Apparatus in accordance with claim 1 including means for shielding the first portion of said bag from the tires of said trailer and means, attached to at least one of said trailer box and said housing, for selectively moving said shielding means with respect to said trailer box between a first position adjacent to the ground and said tires and a second position at an elevation from the ground and spaced from said tires, whereby said shielding means in the first position shields the first portion of said bag from the tires and in the second position may function as a tire mud flap.

5. Apparatus for directing a flowable substance from a transport location to a storage location, comprising:
   a transport container supported on wheels, said transport container having a first bottom;
   an elongated, flexible bag having a first portion resting on the ground and also having a second portion;
   a housing formed as a tunnel, said housing having a second bottom;
   means for attaching said housing to said transport container so that said entire second bottom of said housing is inclined downwardly with respect to the first bottom of said transport container, said second bottom being adjacent to said transport container;
   a ridge member attached to and encircling said housing, said ridge member for retaining a second portion of said bag from slipping off said housing when an open end and folded lengths of said bag are installed about said housing; and
   means for selectively releasing some of the second portion of said bag as the first portion of said bag fills and pulls on the second portion;
   whereby said substance flows under the force of gravity from said transport container along said first bottom through said housing along said second bottom to said first portion of said bag on the ground, said second portion of said bag being pulled by said filling first portion for partial releasing by said releasing means to add to said first portion on the ground for further filling by said flowing substance.

6. Apparatus in accordance with claim 5 including means, located beneath said housing, for supporting a bottom portion of the second portion of said bag and means for attaching said supporting means to at least one of said housing and said transport container.

* * * * *

UNITED STATES PATENT AND TRADEMARK OFFICE
CERTIFICATE OF CORRECTION

PATENT NO.   :   4,611,642

DATED        :   September 16, 1986

INVENTOR(S)  :   Neil E. Durhman

It is certified that error appears in the above-identified patent and that said Letters Patent is hereby corrected as shown below:

Column 2, line 18, after "The" insert --trailer--.

Column 2, line 62, delete "atached" and insert --attached--.

Column 6, line 5, delete "from", first occurrence.

Signed and Sealed this

Tenth Day of February, 1987

Attest:

DONALD J. QUIGG

*Attesting Officer*    *Commissioner of Patents and Trademarks*